(12) United States Patent
Goertzen

(10) Patent No.: US 9,304,211 B2
(45) Date of Patent: Apr. 5, 2016

(54) SCINTILLATION DETECTOR WITH ACTIVE LIGHT GUIDE

(71) Applicant: UNIVERSITY OF MANITOBA, Winnipeg (CA)

(72) Inventor: Andrew L. Goertzen, Winnipeg (CA)

(73) Assignee: University of Manitoba, Winnipeg, Manitoba (CA)

(*) Notice: Subject to any disclaimer, the term of this patent is extended or adjusted under 35 U.S.C. 154(b) by 74 days.

(21) Appl. No.: 14/157,973

(22) Filed: Jan. 17, 2014

(65) Prior Publication Data

US 2014/0203180 A1    Jul. 24, 2014

Related U.S. Application Data

(60) Provisional application No. 61/754,108, filed on Jan. 18, 2013.

(51) Int. Cl.
*G01T 1/20* (2006.01)
*G01T 5/08* (2006.01)

(52) U.S. Cl.
CPC .............. *G01T 1/2006* (2013.01); *G01T 1/2018* (2013.01); *G01T 5/08* (2013.01)

(58) Field of Classification Search
CPC ........ G01T 1/2006; G01T 1/2018; G01T 5/08
See application file for complete search history.

(56) References Cited

U.S. PATENT DOCUMENTS

| 8,084,742 B1 | 12/2011 | Nagarkar |
| 2004/0159792 A1 | 8/2004 | Andreaco et al. |
| 2010/0320389 A1* | 12/2010 | Tonami et al. ............ 250/361 C |
| 2011/0121184 A1 | 5/2011 | Inadama et al. |
| 2011/0260107 A1 | 10/2011 | Spurrier et al. |
| 2013/0077848 A1* | 3/2013 | Yamada et al. ............... 382/131 |

OTHER PUBLICATIONS

Liu et al. "Development of a depth of interaction detector for gamma-rays". 2001. Nuclear Instruments and Methods in Physics Research A. 459: 182-190.*
Seidel et al. "Depth Identification Accuracy of a Three Layer Phoswich PET Detector Module". 1999. IEEE Transactions on Nuclear Science, vol. 46, No. 3, 485-490.*
Bergeron et al. "Performance Evaluation of the LabPET APD-Based Digital PET Scanner". 2009. *IEEE Transactions on Nuclear Science.* 56(1):10-16.
Bircher et al. "Investigation of crystal surface finish and geometry on single LYSO scintillator detector performance for depth-of-interaction measurement with silicon photomultipliers". 2012. *Nuclear Instruments and Methods in Physics Research A.* 693:236-243.
Casey et al. "A Multicrystal Two Dimensional BGO Detector System for Positron Emission Tomography" 1986. *IEEE Transactions on Nuclear Science.* 33(1):460-463.

(Continued)

*Primary Examiner* — Mark R Gaworecki
(74) *Attorney, Agent, or Firm* — Mueting Raasch & Gebhardt, P.A.

(57) ABSTRACT

A scintillation detector array includes a scintillator array comprising a plurality of scintillator elements, a photodetector array comprising a plurality of photodetector elements, an active light guide separating the scintillator array from the photodetector array. The active light guide formed of a scintillator material having different emission properties than the plurality of scintillator elements.

18 Claims, 3 Drawing Sheets

(56) References Cited

OTHER PUBLICATIONS

Chung et al. "TraPET: High performance small animal PET with trapezoidal phoswich detector". 2011. *Nuclear Instruments and Methods in Physics Research A.* 652(1):802-805.

Ito et al. "Positron Emission Tomography (PET) Detectors with Depth-of-Interaction (DOI) Capability". 2011. *Biomed Eng. Lett.* 1:70-81.

Kato et al. "A novel gamma-ray detector with submillimeter resolutions using a monolithic MPPC array with pixelized Ce:LYSO and Ce:GGAG crystals". 2013. *Nuclear Instruments and Methods in Physics Research A.* 699:235-241.

Majewski et al. "Development of a "Resistive" Readout for SiPM Arrays". 2011. *IEEE Nuclear Science Symposium Conference Record* (MIC18.M-206). pp. 3939-3944.

Mintzer et al. "Design and Performance of a New Pixelated-LSO/PSPMT Gamma-Ray Detector for High Resolution PET Imaging". 2007. *IEEE Nuclear Science Symposium Conference Record* (M18-142). pp. 3418-3422.

Schaart et al. "A novel, SiPM-array-based, monolithic scintillator detector for PET". 2009. *Phys. Med. Biol.* 54:3501-3512.

Seidel et al. "Resolution Uniformity and Sensitivity of the NIH ATLAS Small Animal PET Scanner: Comparison to Simulated LSO Scanners Without Depth-of-Interaction Capability". 2003. *IEEE Transactions on Nuclear Science.* 50(5):1347-1350.

Shao et al. "Design Studies of a High Resolution PET Detector Using APD Arrays". 2000. *IEEE Transactions on Nuclear Science.* 47(3):1051-1057.

Siegel et al. "Simple Charge Division Readouts for Imaging Scintillator Arrays Using a Multi-Channel PMT". 1996. *IEEE Transactions on Nuclear Science.* 43(3):1634-1641.

Song et al. "A sub-millimeter resolution PET detector module using a multi-pixel photon counter array". 2010. *Phys. Med. Biol.* 55:2573-2587.

St. James et al. "Image blurring due to light-sharing in PET block detectors". 2006. *Med. Phys.* 33(2):405-410.

Tai et al. "Performance evaluation of the microPET P4: a PET system dedicated to animal imaging". 2001. *Phys. Med. Biol.* 46:1845-1862.

Thompson et al. "Evaluation of a 16:3 Signal Multiplexor to Acquire Signals from a SPM Array with Dual and Single Layer LYSO Crystal Blocks". 2011. *IEEE Transactions on Nuclear Science.* 58(5):2175-2180.

Thompson et al. "Evaluation of High Density Pixellated Crystal Blocks with SiPM Readout as Candidates for PET/MR Detectors in a Small Animal PET Insert". 2012. *IEEE Transactions on Nuclear Science.* 59(5):1791-1797.

Thompson et al. "Evaluation of Very Highly Pixellated Crystal Blocks with SiPM Readout as Candidates for PET/MR Detectors in a Small Animal PET Insert" 2012. *IEEE Nuclear Science Symposium and Medical Imaging Conference Record* (NSS/MIC) (M16-23). pp. 3141-3145.

Wienhard et al. "The ECAT HRRT: Performance and First Clinical Application of the New High Resolution Research Tomograph". 2002. *IEEE Transactions on Nuclear Science.* 49(1):104-110.

Yang et al. "Depth of interaction resolution measurements for a high resolution PET detector using position sensitive avalanche photodiodes". 2006. *Phys. Med. Biol.* 51:2131-2142.

\* cited by examiner

SCINTILLATION DETECTOR WITH ACTIVE LIGHT GUIDE

RELATED APPLICATIONS

This application claims the benefit of the U.S. Provisional Application No. 61/754,108, filed 18 Jan. 2013, which is incorporated by reference in its entirety.

FIELD

This disclosure relates to nuclear imaging detectors and, in particular, to a scintillation detector using an active light guide.

BACKGROUND

One common type of detector for nuclear medicine imaging systems is the scintillation detector. In this detector gamma-rays or other ionizing radiations are absorbed by high density scintillator materials such as lutetium oxyorthosilicate (LSO), lutetium-yttrium oxyorthosilicate (LYSO), sodium iodide (NaI) or cesium iodide (CsI), for example. The energy deposited in the scintillator by the gamma-rays is converted into visible light photons, which are subsequently detected by a photodetector coupled to the scintillator. Photodetectors commonly used in nuclear medicine include photomultiplier tubes (PMTs), avalanche photodiodes (APDs) and Geiger-mode APDs (GAPDs), also called silicon photomultipliers (SiPMs) or multi-pixel photon counters (MPPCs).

Devices for detecting the distribution of gamma rays transmitted through or emitted from objects to study the compositions or functions of the objects are well known to the art, e.g. the techniques referred to as Emission Computed Tomography can be divided into two specific classes; Single Photon Emission Computed Tomography (SPECT) uses radiotracers which emit gamma-rays and Positron Emission Tomography (PET) which uses radiotracers that emit positrons. Therefore, the fundamental physical difference between the two techniques is that PET uses annihilation coincidence detection to define a line of response (LOR) while SPECT uses an absorptive collimator to define the directionality of the detected gamma-ray. The PET technique can determine, in-vivo, biochemical functions, on the injection of biochemical analog radiotracer molecules that emit positrons in a living body. The positrons annihilate with surrounding electrons in the subject body to produce a pair of annihilation photons (also sometimes referred to as gamma-rays), each having 511 keV of energy; traveling in nearly opposite directions. The detection of a pair of annihilation photons or gamma-rays by two opposed detectors allows for the determination of the location and direction in space of a trajectory line defined by the opposite trajectories of the gamma-rays. Tomographic reconstruction is then used to superpose the numerous trajectory lines obtained by surveying the subject with an array of detectors to image the distribution of radiotracer molecules in the living body.

Spatial resolution of a nuclear medicine imaging detector depends on how precisely the location of the gamma-ray interaction in the scintillator crystal can be determined. One commonly used approach to create high resolution detectors is to pixilate the scintillator crystal into small elements. In this type of design, the spatial sampling of the system is determined by the size of the scintillator crystal element used. These small crystal sizes make it difficult to use a one-to-one coupling (scintillator crystal to photodetector) due to the small size of photodetector required and the large number of readout channels required.

An alternative to one-to-one coupling is to use a light-sharing design in which an array of scintillator crystals are read out by a small number of photodetectors. In these detectors, the location of the gamma interaction (i.e. determination of which scintillator crystal the gamma interacted in) is measured by comparing the relative signals in the array of photodetectors. These light-sharing designs are in general based on the original 'block detector' design.

Light sharing detectors typically require a light guide to be placed between the scintillator crystal array and the photodetector array in order to sufficiently distribute the light between the sensors in the photodetector array and allow an accurate determination of position of interaction. If there is not a sufficient amount of light-spread, then two neighboring scintillator crystals might produce signal patterns on the photodetectors that are too similar to be individually resolved. Without the light guide, there would not be sufficient light spread to allow the decoding of these small crystals, particularly for crystals along the perimeter of the scintillator crystal array and the photodetector array.

These light guides can be made of a glass or other optically transparent material with a thickness of up to a few millimeters for silicon photomultiplier (SiPM) based photodetector arrays. In many cases, the active area of the photodetector array is less than the total package area of the photodetector array, creating a dead-space around the photodetector array. For scintillation detector manufacturing it is desirable to have a scintillator crystal array that is the same area as the total photodetector package area to avoid gaps between adjacent detector modules created by the dead space around the photodetector arrays. In these cases, it is common to use a tapered or similar design light guide that minifies the footprint of the scintillator crystal array so that it can be read out by the photodetector array with smaller area. This technique is used successfully in many photomultiplier tube (PMT) based detector designs.

SiPM based photodetector arrays are being introduced that area created by tiling individual photodetector pixels, each with very minimal dead-space borders, leading to photodetector arrays that have nearly zero dead-space around their border. The lack of dead-space means that the scintillator crystal array can have an active area equal to the total photodetector array area and there is no need for a minifying light guide. Since the photodetector array is assembled from individual photodetector pixels that are not optically contiguous, there is still a need for a light guide between the scintillator and photodetector arrays to act as a light diffuser for the purpose of spreading light between multiple photodetector array elements.

In detectors for nuclear imaging, particularly in applications involving positron emission tomography (PET), it is desirable to have detectors with the capability to determine the depth of the gamma-ray interaction along the length of the scintillator element. Detectors with this ability are termed depth-of-interaction (DOI) capable detectors.

BRIEF SUMMARY

This disclosure relates to nuclear imaging detectors and, in particular, to a scintillation detector using an active light guide. The disclosure also relates to nuclear imaging detectors that can determine the depth of the gamma-ray interaction along the length of the scintillator element and light guide.

In many embodiments, a scintillation detector array includes a scintillator array comprising a plurality of scintillator elements, a photodetector array comprising a plurality of photodetector elements, an active light guide separating the scintillator array from the photodetector array. The active light guide is formed of a scintillator material having different emission properties than the plurality of scintillator elements.

In further embodiments, a scintillation detector array includes a scintillator array comprising a plurality of layers and each layer comprising a plurality of scintillator elements, a photodetector array comprising a plurality of photodetector elements, and an active light guide separating the scintillator array from the photodetector array. The active light guide is formed of a scintillator material having different emission properties than the plurality of scintillator elements.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

The disclosure may be more completely understood in consideration of the following detailed description of various embodiments of the disclosure in connection with the accompanying drawings, in which.

DETAILED DESCRIPTION

Figure 1:
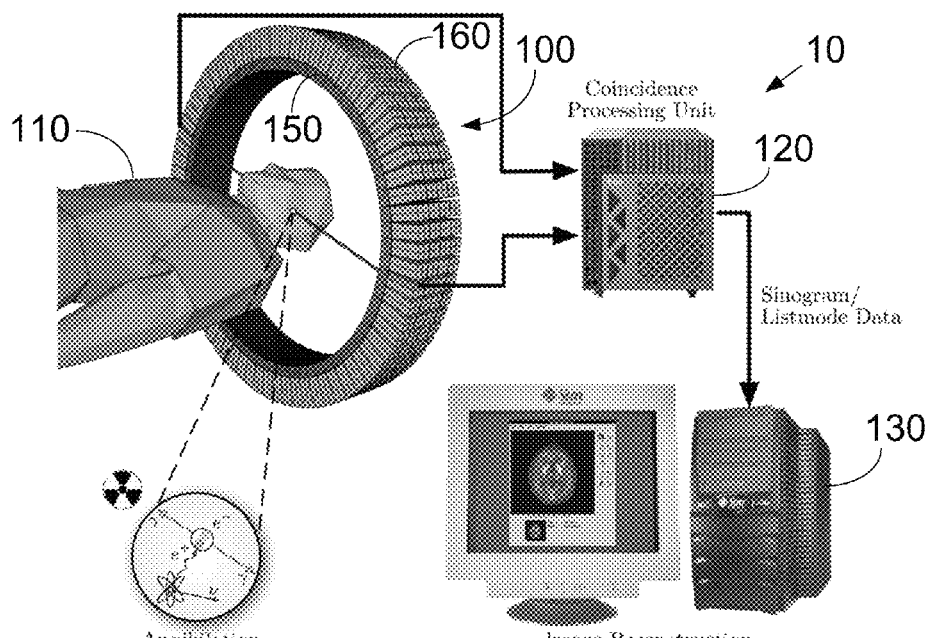
FIG. 1 is a schematic diagram of an illustrative PET acquisition process.

In the following detailed description, reference is made to the accompanying drawings that form a part hereof, and in which are shown by way of illustration several specific embodiments. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, when an element, component or layer for example is described as forming a "coincident interface" with, or being "on", "connected to," "coupled with", "in contact with", "separating" or "adjacent" another element, component or layer, it can be directly on, directly connected to, directly coupled with, in direct contact with, or intervening elements, components or layers may be on, connected, coupled or in contact with or separating the particular element, component or layer, for example. When an element, component or layer for example is referred to as being "directly on," "directly connected to," "directly coupled with," or "directly in contact with" another element, there are no intervening elements, components or layers for example.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

The term "active light guide" refers to a light guide that is formed of a scintillating material.

The term "light guide" refers to a light transmissive element that is configured to spread or otherwise direct light.

This disclosure relates to nuclear imaging detectors and, in particular, to a scintillation detector using an active light guide, among other aspects. The disclosure relates to nuclear imaging detectors that can determine the depth of the gamma-ray interaction along the length of the scintillator element and light guide. By using scintillator materials with different emission properties in the light guide and in the scintillator crystal array it is possible to distinguish which layer the gamma-ray interaction occurred in by measuring the differences in the scintillation light emission properties. This results in a depth-of-interaction (DOI) capable detector with two layers of DOI information if the scintillator crystal array is a single layer. Including a light guide with a different scintillator material than the main crystal element array material and using the differences in scintillation light properties to identify events that occur in the light guide will allow any general DOI capable detector built using discrete layers of scintillator crystal elements to add an additional layer of DOI information. While the present disclosure is not so limited, an appreciation of various aspects of the disclosure will be gained through a discussion of the examples provided below.

Figure 2:
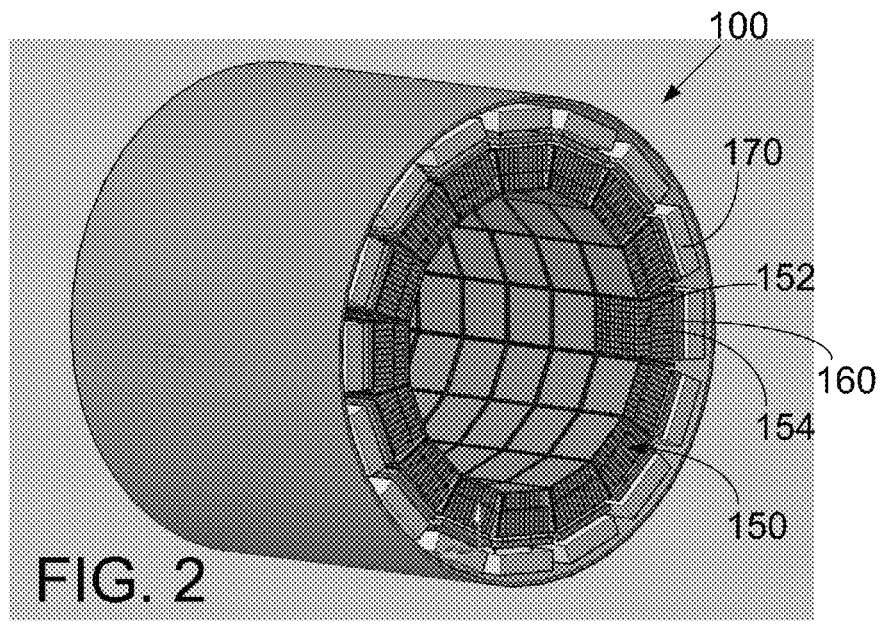
FIG. 2 is a perspective view of an illustrative nuclear imaging detector.

FIG. 1 is a schematic diagram of an illustrative PET acquisition process 10. FIG. 2 is a perspective view of an illustrative nuclear imaging detector 100. A subject 110 is placed within a nuclear imaging detector 100. A radioactive tracer isotope is placed into the subject 110. As the radioisotope undergoes positron emission decay, it emits a positron, an antiparticle of the electron with opposite charge. The emitted positron travels in tissue and loses kinetic energy until it can interact with an electron. The encounter annihilates both electron and positron, producing a pair of annihilation (gamma) photons moving in approximately opposite directions. These are detected by the nuclear imaging detector 100 by the scintillator array 150 and creating a burst of light that is detected by the photodetector array 160 that is coupled to the scintillator array 150. As illustrated, the nuclear imaging detector 100 includes a plurality of scintillator arrays 150 and coupled photodetector arrays 160. The technique depends on simultaneous or coincident detection of the pair of photons moving in approximate opposite directions.

Each scintillator array 150 and coupled photodetector array 160 is connected to a circuit board 170 and provide electronic data to a coincidence processing unit 120. The raw data collected is a list of 'coincidence events' representing near-simultaneous detection (typically, within a window of less than 10 nanoseconds of each other) of annihilation photons by a pair of detectors. Each coincidence event represents a line in space connecting the two detectors along which the positron emission occurred (i.e., the line of response (LOR)). Modern systems with sufficient time resolution (500 picoseconds or less) use a technique (called "time-of-flight") where they more precisely decide the difference in time between the detection of the two photons and can thus localize the point of origin of the annihilation event between the two detectors. A coincidence timing window is about 4-6 nanoseconds due to transit time of the 511 keV photons. Coincidence events can be grouped into projection images, called sinograms. The sinograms are sorted by the angle of each view and tilt (for 3D images). A normal PET data set has millions of counts for the whole acquisition. The sinograms or listmode data is then utilized to achieve image reconstruction 130.

Figure 3:
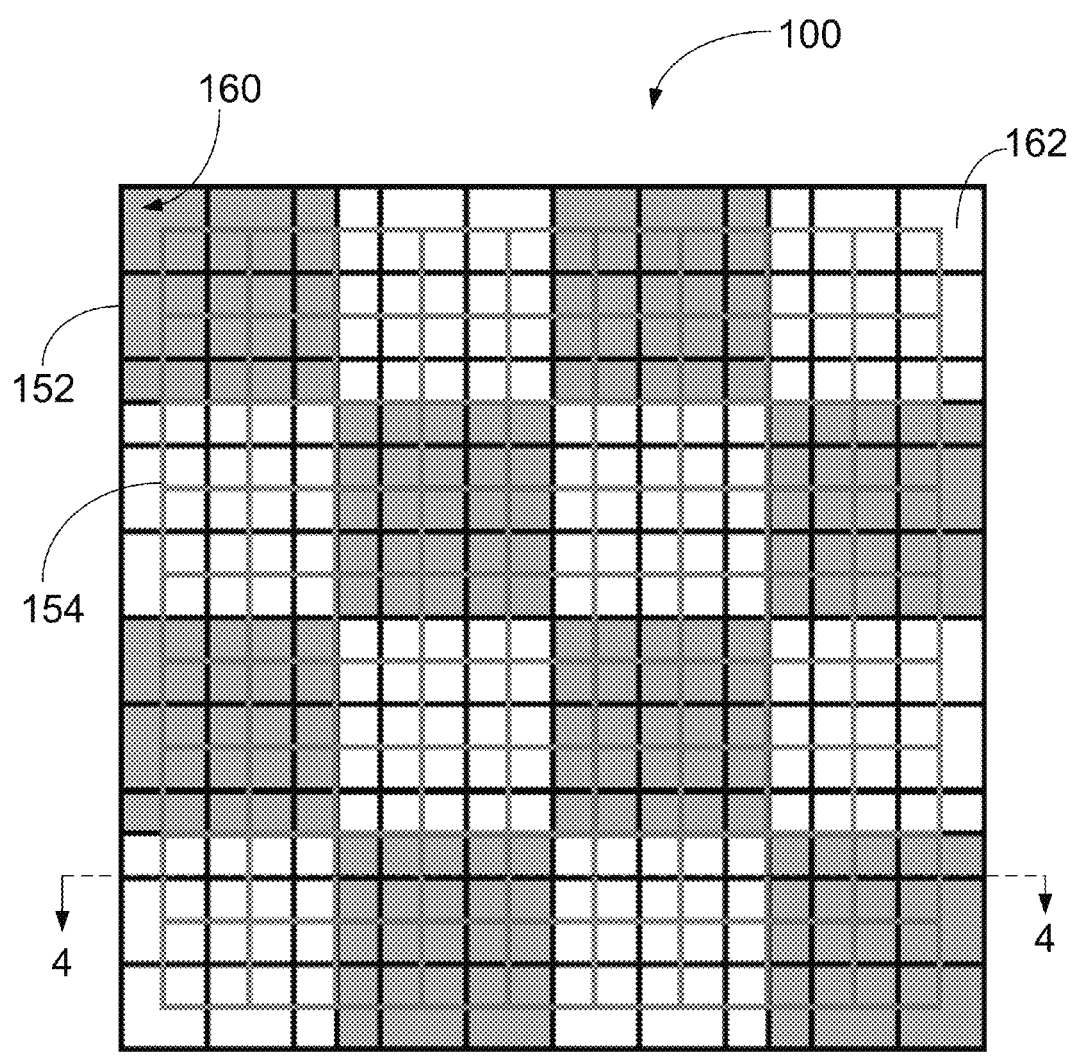
FIG. 3 is a schematic diagram top view of an illustrative off-set detector array.

FIG. 3 is a schematic diagram top view of an illustrative off-set detector array 100. The grey and white 4×4 checkerboard illustrates the photodetector array 160 disposed beneath the scintillator array formed by layers of scintillator elements 152, 154. The layer 152 is a 10×10 array of scintillator elements. The layer 154 is a 9×9 array of scintillator elements and are off-set from the layer 152.

Figure 4:
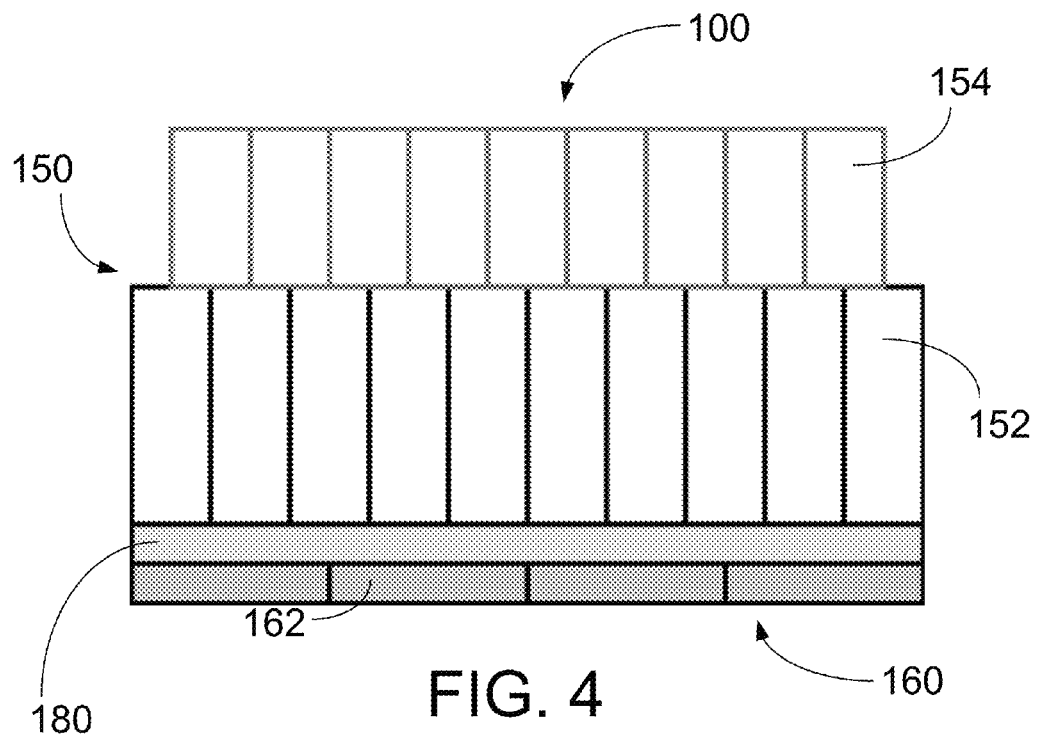
FIG. 4 is a cross-sectional view of the off-set detector array of FIG. 3 taken along line 4-4.
Figure 5:
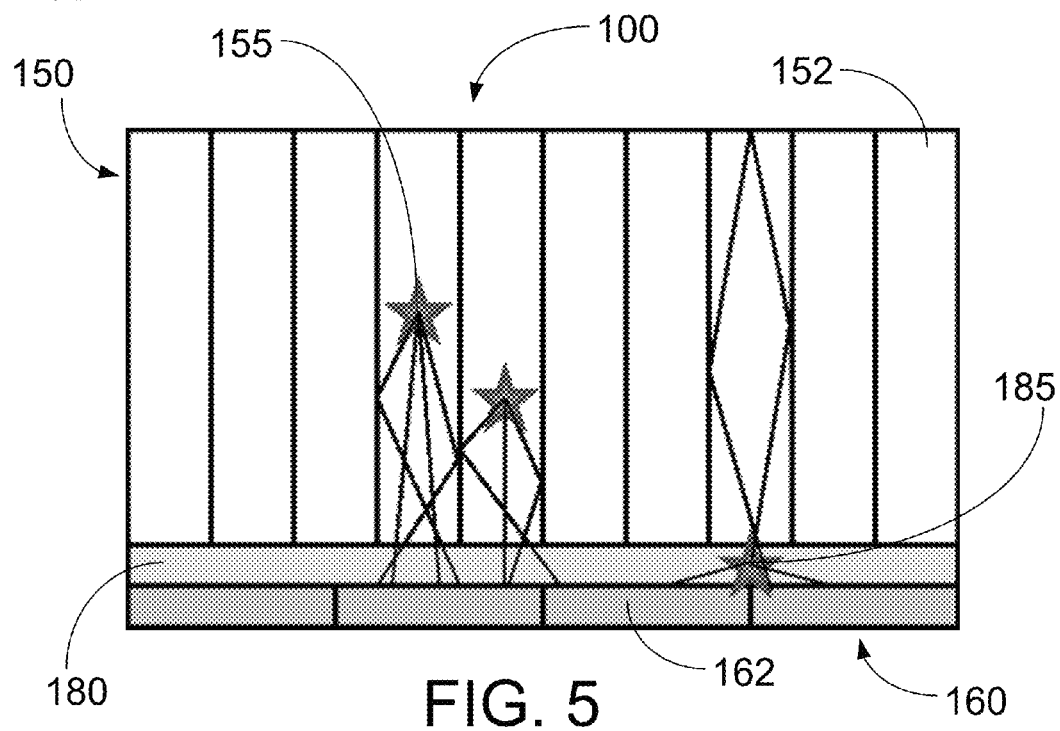
FIG. 5 is a cross-sectional view of another illustrative detector array illustrating gamma-ray interactions.

FIG. 4 is a cross-sectional view of the off-set detector array of FIG. 3 taken along line 4-4. FIG. 5 is a cross-sectional view of another illustrative detector array illustrating gamma-ray interactions. In one or more embodiments, each scintillator array 150 is optically coupled to a corresponding photodetector array 160 via a light guide 180. The light guide 180 separates the scintillator array 150 from the photodetector array 160.

In many embodiments, a scintillation detector array 100 includes a scintillator array 150 including a plurality of scintillator elements 152, 154, a photodetector array 160 including a plurality of photodetector elements 162, and an active light guide separating the scintillator array from the photodetector array, the active light guide 180 formed of a scintillator material having different emission properties than the plurality of scintillator elements 152, 154. For active light guides 180 made of scintillators with different properties than the scintillator elements 152, 154, gamma-ray interactions that occur in the light guide 180 can be uniquely identified through the differences in the scintillation light emission properties of the scintillator material (e.g. wavelength of scintillation light, rise time of signal, decay time of detector signal, etc.), thus creating a depth-of-interaction (DOI) capable detector. Including an active light guide 180 with a different scintillator material than the main crystal element array material 150 and using the differences in scintillation light properties to identify events that occur in the active light guide 180 will allow any general DOI capable detector built using discrete layers of scintillator crystal elements to add an additional layer of DOI information.

In many embodiments, the scintillator array 150 includes at least two layers of scintillator elements 152, 154. In these embodiments, each layer is formed of a scintillator material having different emission properties. In many of these embodiments, each layer of scintillator elements 152, 154 are off-set from each other as illustrated in FIG. 4. By using a different scintillator material for the light guide as compared with the material used for the crystal arrays, it is possible to use the light emission properties of the two scintillators to discriminate which events occurred in the light guide.

The at least two layers of scintillator elements 152, 154 and active light guide 180 can be formed of any useful scintillator material having different emission properties. These materials include, for example: Cerium-doped Lutetium Oxyorthosilicate, ("LSO"), Cerium-doped Lutetium Yttrium Oxyorthosilicate, ("LYSO"), Cerium-doped Lutetium Gadolinium Oxyorthosilicate, ("LGSO"), Cerium-doped Gadolinium Oxyorthosilicate, ("GSO"), Cerium-doped Lutetium Aluminum Perovskite, ("LuAP"), and Cerium-doped Yttrium Aluminum Perovskite, ("YAP"). Also, Cerium-doped Yttrium Oxyorthosilicate, ("YSO"), can be selected as a scintillator material. The at least two layers of scintillator elements 152, 154 and active light guide 180 can be formed of a same material (e.g., LSO) but each layer of this material can be doped at different levels to create different decay times.

In one or more embodiments, the plurality of scintillator elements are formed of LSO or LYSO material and the active light guide is formed of LGSO material. In one or more embodiments, the plurality of scintillator elements are formed of LSO doped with a single dopant such as Ce, for example and the active light guide is formed of LSO that is co doped with two dopants such as Ce and Ca or other divalent cations, for example. LSO material doped with one and two different dopants. These LSO materials are disclosed in US 2011/0260107 and is incorporated by reference herein.

The active light guide 180 can be a continuous element or a non-continuous element. In one or more embodiments, the active light guide 180 has a thickness that is 50% or less than a thickness of the scintillator array. In embodiments where there are two or more layers of scintillator material, the active light guide 180 has a thickness that is 50% or less than a thickness of each layer of the two or more layers of scintillator elements. In one illustrative embodiment, the scintillation detector array 100 includes two scintillator crystal layers 152, 154 having substantially the same thickness (about 4 mm) and an active light guide 180 having a thickness of about 50% of each scintillator crystal layers 152, 154 (about 2 mm).

In FIG. 5, gamma-ray interactions 155, 185 can occur in the scintillator crystals (left two stars 155) and in the active light guide (right-most star 185). For gamma-ray interactions that occur in the active light guide, the scintillation light that is emitted upwards into the crystal array will be reflected by the reflective materials surrounding the crystal so that the apparent locations of interaction of these scintillation events will closely mirror the locations of the scintillation events that occur in the crystal above the interaction point.

The benefit of this design is that the scintillation light created by gamma-ray interactions in the light guide will have a signal distribution on the photodetector array similar to the gamma-ray interaction events that occur in the scintillator crystal array due to the fact that 50% of the scintillation light will be emitted upwards into the scintillator crystal array and then be reflected back down in a focused manner. This will result in good event positioning accuracy over the entire area of the active light guide. By using scintillator materials with different emission properties in the active light guide and in the scintillator crystal array it is possible to distinguish which layer the gamma-ray interaction occurred in by measuring the differences in the scintillation light emission properties. This will result in a DOI capable detector with two layers of DOI information if the scintillator crystal array is a single layer. For scintillator crystal arrays that are built using multiple layers of scintillator crystal arrays and decoded through light sharing techniques, using a light guide made of a scintillator material that is different from the scintillator crystal array material would allow an additional level of DOI information to be added to the detector.

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. A scintillation detector array comprising:
a scintillator array comprising a plurality of scintillator elements and defining a layer of scintillator elements having a scintillator layer thickness;
a photodetector array comprising a plurality of photodetector elements; and
an active light guide separating the scintillator array from the photodetector array, the active light guide formed of a scintillator material having different emission properties than the plurality of scintillator elements, wherein the active light guide defines a thickness that is 50% or less than the scintillator layer thickness.

2. The scintillation detector array of claim 1, wherein the scintillator array comprises at least two layers of scintillator elements where each layer is formed of a scintillator material having different emission properties.

3. The scintillation detector array of claim 2, wherein each layer of scintillator elements are off-set from each other.

4. The scintillation detector array of claim 2, wherein the active light guide has a thickness that is 50% or less than a thickness of each layer of the at least two layers of scintillator elements.

5. The scintillation detector array of claim 1, wherein the active light guide is a continuous element.

6. The scintillation detector array of claim 1, wherein the active light guide is a non-continuous element.

7. The scintillation detector array of claim 1, wherein the scintillation detector array is configured to determine a position of a gamma-ray interaction within the active light guide.

8. The scintillation detector array of claim 1, wherein the plurality of scintillator elements comprise LSO or LYSO and the active light guide comprises LGSO.

9. The scintillation detector array of claim 1, wherein the plurality of scintillator elements comprise LSO doped with a first dopant and the active light guide comprises LSO doped with a second dopant being different than the first dopant.

10. The scintillation detector array of claim 1, wherein the plurality of scintillator elements comprise LSO doped with Ce and the active light guide comprises LSO doped with Ce and Ca.

11. A scintillation detector array comprising:
a scintillator array comprising a plurality of layers and each layer comprising a plurality of scintillator elements, the scintillator array defining an active scintillator area bounded by an outer perimeter of the scintillator array;
a photodetector array comprising a plurality of photodetector elements; and
an active light guide separating the scintillator array from the photodetector array, the active light guide formed of a scintillator material having different emission properties than the plurality of scintillator elements, wherein the active light guide optically couples the scintillator array to the photodetector array continuously across the active scintillator area.

12. The scintillation detector array of claim 11, wherein each layer of scintillator elements are off-set from each other.

13. The scintillation detector array of claim 11, wherein the active light guide has a thickness that is 50% or less than a thickness of the scintillator array.

14. The scintillation detector array of claim 11, wherein the active light guide has a thickness that is 50% or less than a thickness of each layer of the at least two layers of scintillator elements.

15. The scintillation detector array of claim 11, wherein the scintillation detector array is configured to determine a position of a gamma-ray interaction within the active light guide.

16. The scintillation detector array of claim 11, wherein the plurality of scintillator elements comprise LSO or LYSO and the active light guide comprises LGSO.

17. The scintillation detector array of claim 11, wherein the plurality of scintillator elements comprise LSO doped with a first dopant and the active light guide comprises LSO doped with a second dopant being different than the first dopant.

18. The scintillation detector array of claim 11, wherein the plurality of scintillator elements comprise LSO doped with Ce and the active light guide comprises LSO doped with Ce and Ca.

* * * * *